United States Patent [19]

Gremel et al.

[11] Patent Number: 5,762,875
[45] Date of Patent: Jun. 9, 1998

[54] CORE STRUCTURE FOR BLOOD OXYGENATORS

[75] Inventors: Robert F. Gremel, Huntington Beach; Roger J. Elgas, Anaheim Hills, both of Calif.

[73] Assignee: Medtronic, Inc., Minneapolis, Minn.

[21] Appl. No.: 586,523

[22] Filed: Jan. 16, 1996

[51] Int. Cl.$^6$ .................................................. A61M 1/14
[52] U.S. Cl. ........................... 422/45; 422/46; 261/DIG. 28
[58] Field of Search ............................. 422/45, 46, 48; 261/104, DIG. 28; 210/472, 436

[56] References Cited

U.S. PATENT DOCUMENTS 5,462,619  10/1995  Haworth et al. ..................... 156/172

FOREIGN PATENT DOCUMENTS 0713709  5/1996  European Pat. Off. .
08019601  1/1996  Japan .

OTHER PUBLICATIONS

JAPIO abstract of JP 08019601 (Nakanishi Hikari), Jan. 23, 1996.

*Primary Examiner*—Robert J. Warden
*Assistant Examiner*—Alex Noguerola
*Attorney, Agent, or Firm*—Harry G. Weissenberger

[57] ABSTRACT

The obstruction of a curved blood manifold window in a blood oxygenator by oxygenation fibers which lie along a chord of a curved window when wound upon the oxygenator core is avoided by recessing the manifold wall portions most closely adjacent the window sufficiently so that the fibers lying on that chord remain sufficiently spaced from those closest wall portions to allow blood flow between those wall portions and the closest fibers.

5 Claims, 4 Drawing Sheets

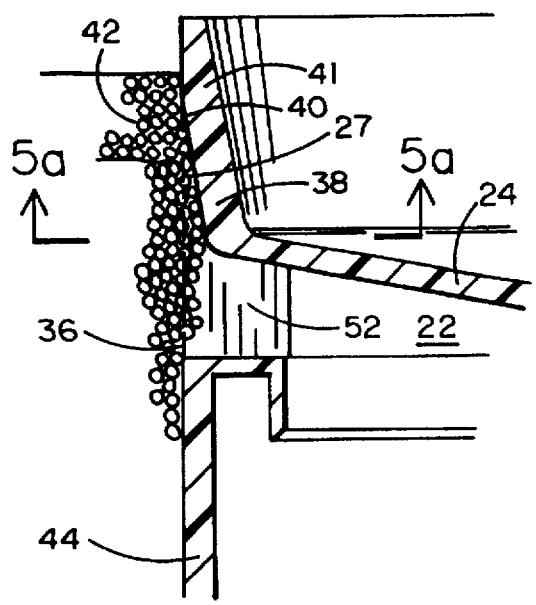
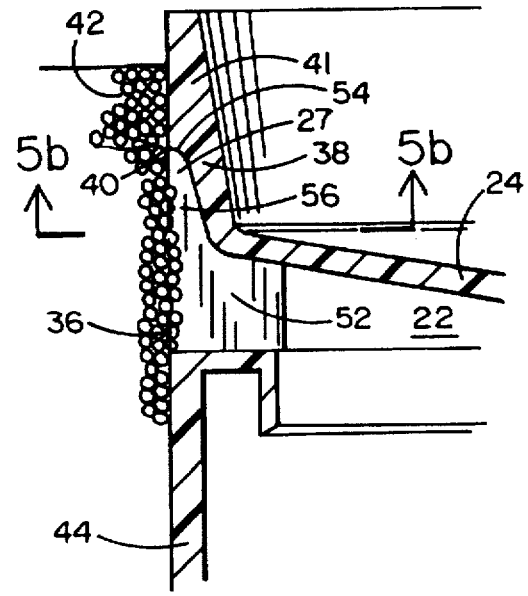
FIG. 4a
PRIOR ART
FIG. 4b
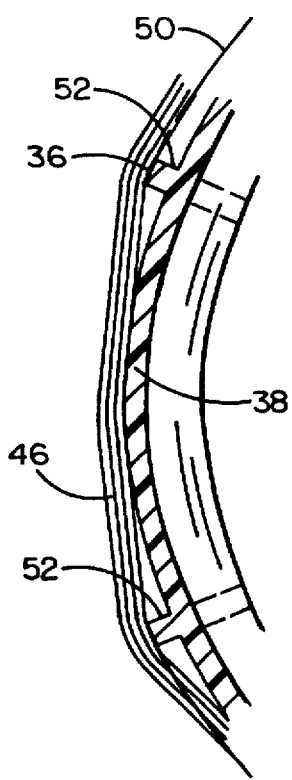
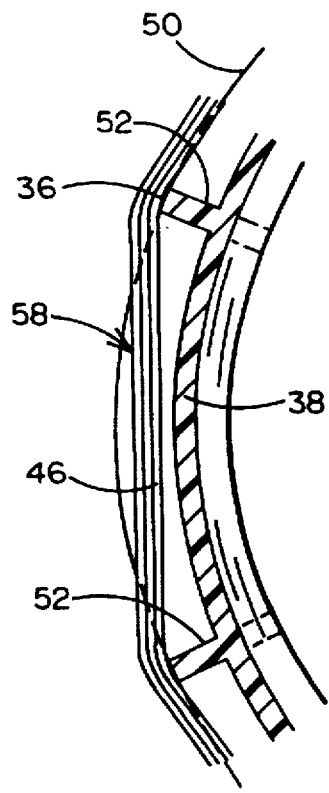
FIG. 5a
PRIOR ART
FIG. 5b 5,762,875

1

CORE STRUCTURE FOR BLOOD OXYGENATORS

FIELD OF THE INVENTION

This invention relates to blood oxygenators, and more particularly to an oxygenator core so structured that the oxygenating fibers cannot obstruct the blood manifold window when they are wound on the core.

BACKGROUND OF THE INVENTION

In a blood oxygenator, such as those used in cardiac bypass surgery, the patient's blood is caused to flow through a fiber bundle consisting of layers of hollow fibers cross-wound on a polycarbonate core. The fibers are hollow microporous fibers with an outside diameter typically somewhat less than 0.5 mm. By means of a conventional potting and cutting process, the continuously wound fibers are converted into a multitude of conduits through which appropriate gases, such as oxygen and anesthetics, can be caused to flow. As the fibers are washed by blood flowing through the fiber bundle around the outside of the fibers, gas transfer occurs through the microporous material, and the blood takes up oxygen from the fibers and releases carbon dioxide into the fibers by diffusion through the fibers.

The design of the core on which the fibers are wound, and particularly of the manifold window through which incoming blood enters the inside of the generally cylindrical fiber bundle, is quite critical for the proper operation of the oxygenator. Co-pending U.S. patent application Ser. No. 08/586,163 filed 11 Jan. 1996 and entitled Transition Manifold For Blood Oxygenator Apparatus shows a preferred form of blood manifold in which blood flows from the manifold into the fiber bundle through a series of specially shaped windows disposed around the periphery of the core near the upper end of the fiber bundle.

A vexing problem occurs in the fabrication of an oxygenator of this type. In axial cross section, the blood manifold is tapered so that the upper wall of the manifold approaches the fiber bundle at the window surface at a steep angle. The height of the window at the window surface is a critical design parameter. The design presupposes that the fiber bundle in the area of the windows is circular, i.e. that the window surface defined by the innermost layer of fibers is curved. In reality, however, this is not the case. Although between windows, the core is essentially cylindrical so as to support the wound fibers in a cylindrical shape, the fibers are unsupported in the window itself and therefore form a straight chord from one circumferential edge of the window to the other. In the region in which the manifold wall steeply approaches the window surface, the positioning of the fibers along a chord rather than the circumference of a circle can actually cause a portion of the window to become obstructed. Because of the criticality of the window height at the window surface, even a slight obstruction of the window in that region materially interferes with the function of the oxygenator.

SUMMARY OF THE INVENTION

The present invention solves the above-described problem by recessing the manifold wall at the critical window portion to maintain sufficient spacing for adequate blood flow between the fiber bundle and the manifold wall even though the fibers do position themselves along a chord of the core surface at the windows.

2

Figure 1:
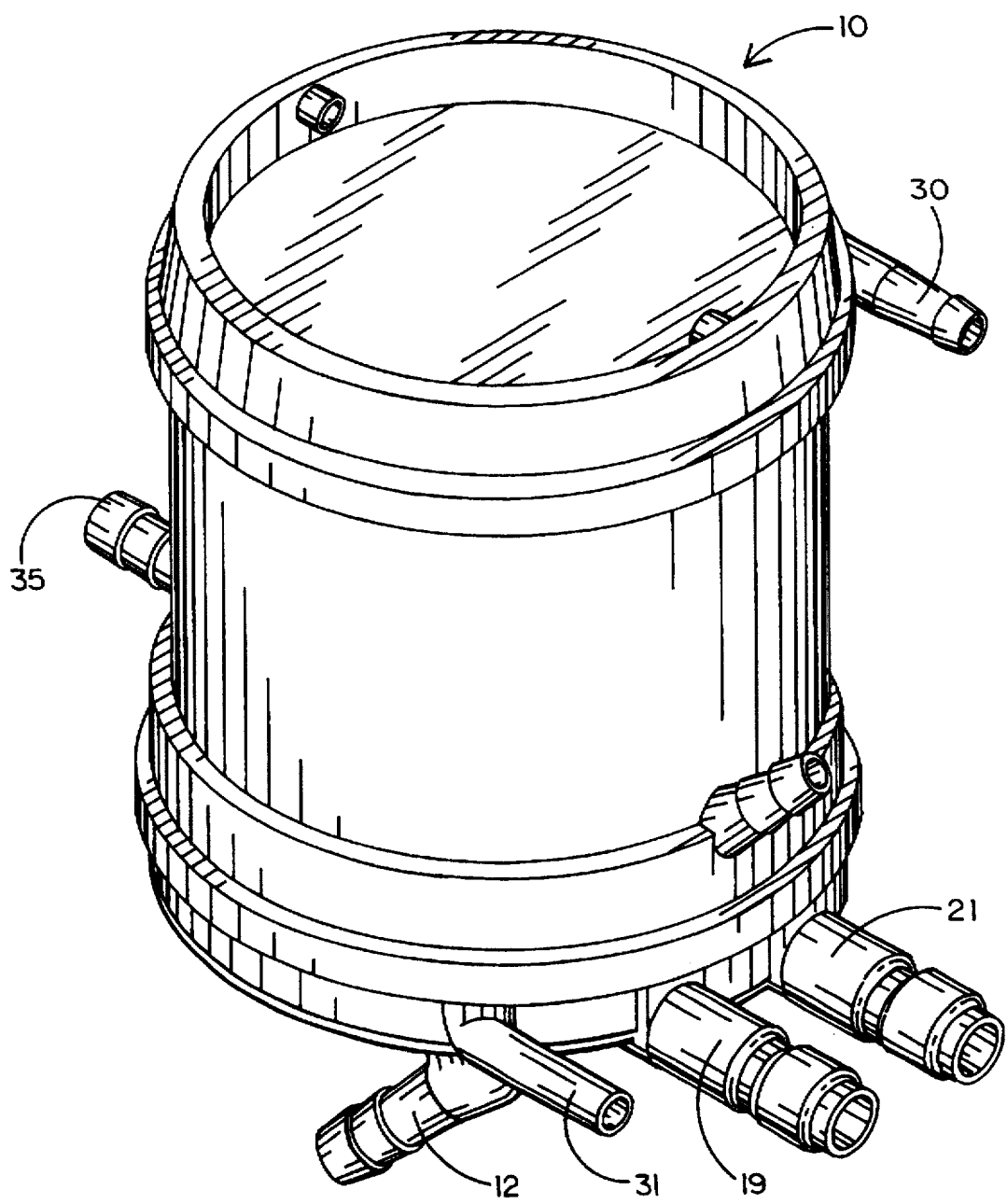
FIG. 1 is a perspective view of a blood oxygenator using the invention.
Figure 2B:
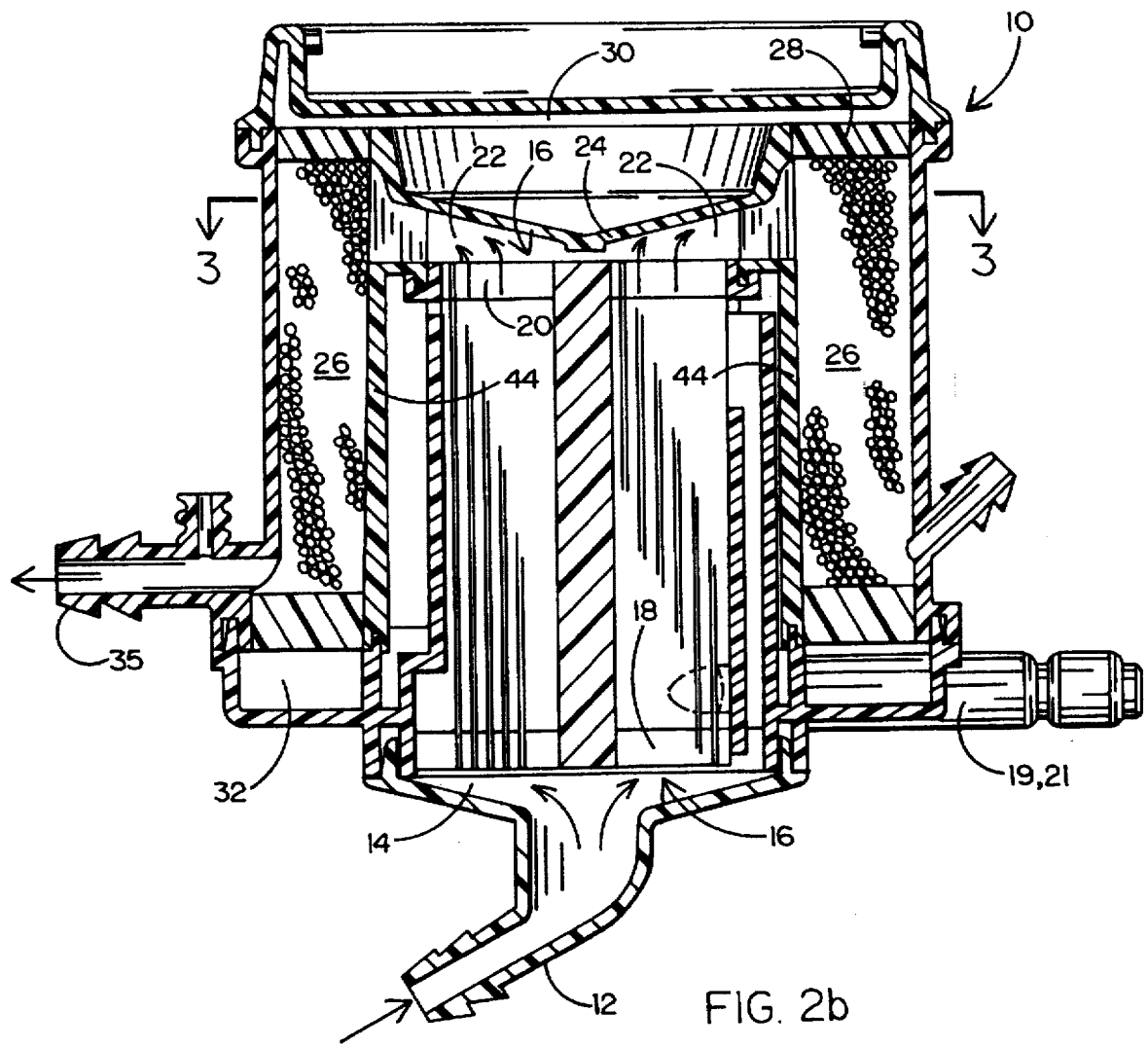
Figure 2A:
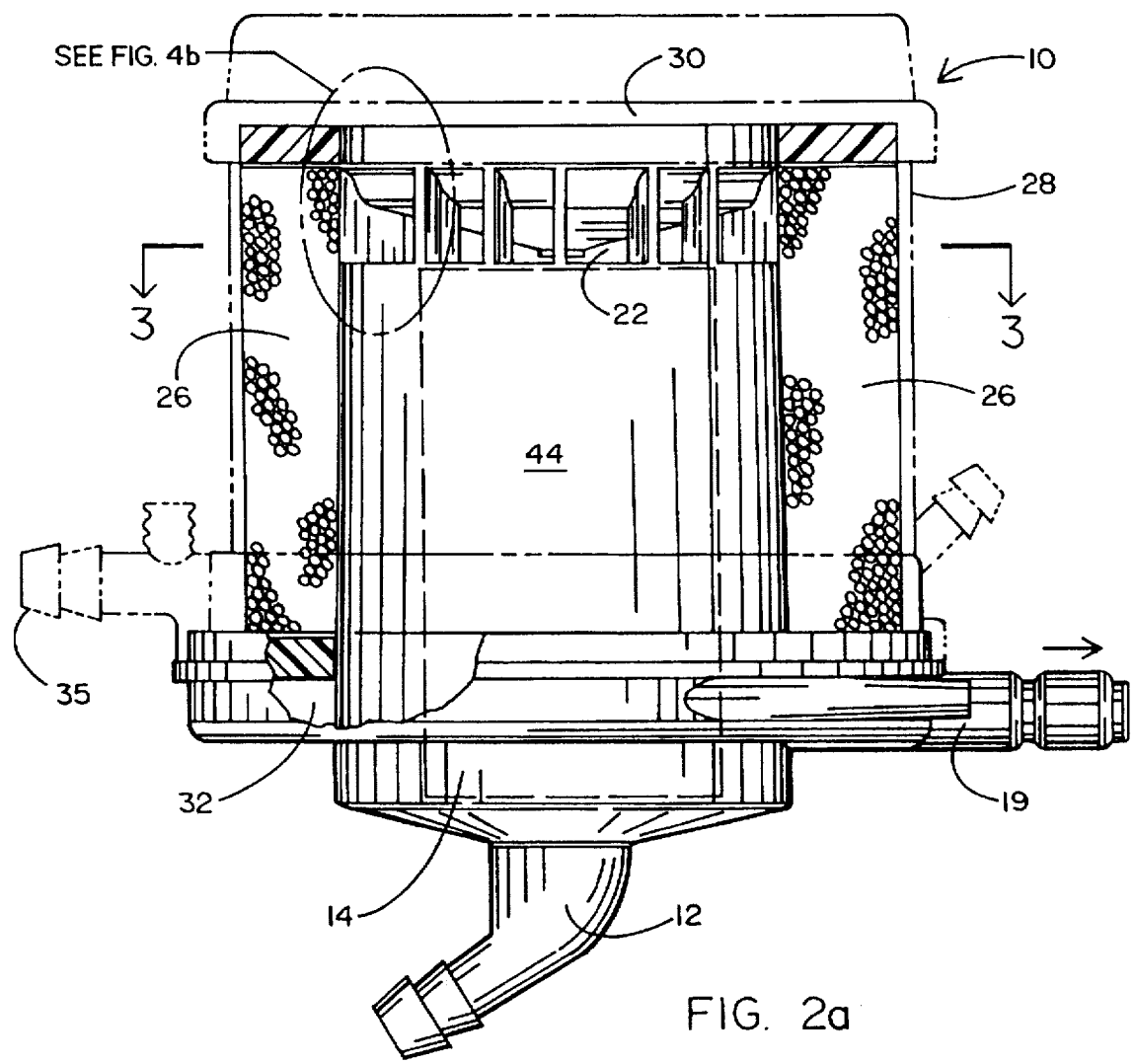
Figure 3:
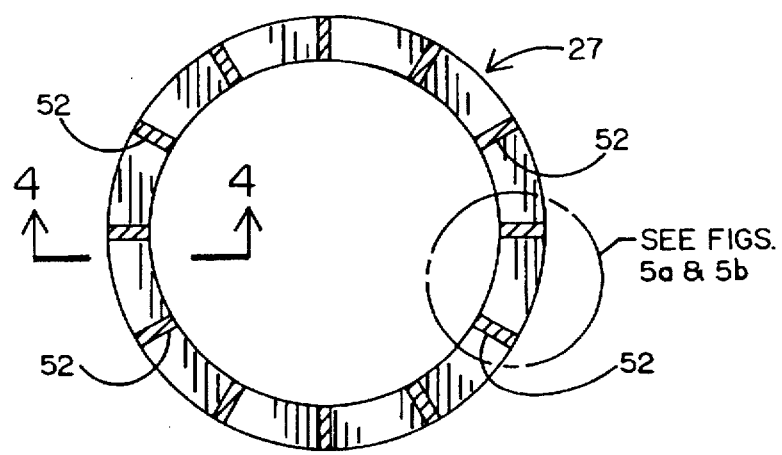

FIG. 2a is a partial elevation, partly in section, of the blood oxygenator of FIG. 1;

FIG. 2b is an axial vertical section through the blood oxygenator of FIG. 1;

FIG. 3 is a horizontal section along line 3—3 of FIG. 2;

FIG. 4a is a detail fragmentary section along line 4—4 of FIG. 3 showing a prior art construction;

FIG. 4b is a detail fragmentary section along line 4—4 of FIG. 3 showing the inventive construction;

FIG. 5a is a detail fragmentary section along line 5a—5a of FIG. 4a; and

FIG. 5b is a detail fragmentary section along line 5b—5b of FIG. 4b.

DESCRIPTION OF THE PREFERRED EMBODIMENT

FIG. 1 shows a blood oxygenator 10 of the type in which the present invention is useful. Blood enters the oxygenator at 12, is cooled in a heat exchanger 16 (FIG. 2b) by cooling water introduced at 19 and exiting at 21, and is then oxygenated by a combination of oxygen and therapeutic gases which is introduced into the oxygenator fibers 26 at 30 and exhausted at 31. The oxygenated blood exits the oxygenator 10 at 35.

The internal construction of the oxygenation section of oxygenator 10 is shown in FIG. 2b. In that figure, the blood entering the oxygenator 10 through inlet 12 fills the manifold 14. It then rises through a heat exchanger 16 which consists of blood-conducting tubes that are washed by cooling water introduced into the heat exchanger between the potting seals 18, 20 in a manner not material to this invention.

The blood exits the heat exchanger 16 at the top surface of the potting seal 20 into the manifold 22.

It is important to the design of the oxygenator to minimize the internal, thus defining the shape of the manifold 22. The design further requires a minimum cross sectional area for the windows 27 to maximize performance. For these reasons, the portion 38 of the manifold wall 24 need to be steeply inclined in close proximity to the window 27.

From the manifold 22, the blood enters the oxygenator fiber bundle 26 through windows 27 formed by gaps in the core 44 made by vanes 52. The fibers of fiber bundle 26 convey oxygen from the gas inlet manifold 30 to the gas outlet manifold 32. As the fibers of bundle 26 are washed by blood entering the fiber bundle area 26 from manifold 22 and exiting through blood outlet 35 gas exchange takes place through the micropores of the fibers of bundle 26, and the blood exchanges its carbon dioxide content for oxygen.

In order for the proper blood flow velocities to be maintained as the blood enters the fiber bundle 26, it is necessary that the window height, i.e. the height of the windows 27 where the manifold 22 contacts the fiber bundle 26, be sufficient and fully usable. For that reason, the manifold wall 24 is made to curve steeply upward at 38 in the vicinity of window 27. The particular shape of the manifold wall 24 is the subject of the above-identified U.S. Patent application Ser. No. 08/586,163.

From a design point of view, it would be logical to terminate the steeply inclined portion 38 of manifold wall 24 at a point 40 (FIG. 4a) where it joins the vertical portion 41 of the manifold wall 24 which supports the potting seal 42 of the fiber bundle 26. This works well in theory, but a practical problem occurs in fabrication. This problem is illustrated in FIG. 5a.

The fiber bundle 26 is fabricated by winding strands of fibers onto the slightly frustoconical core 44 (FIG. 2a) at an angle of about 10° from the horizontal along the circumference of core 44, successive layers being angled alternately upward and downward from a plane perpendicular to the axis of core 44. As will be seen from FIGS. 5a and 5b, the fibers 46 at the level of the windows 27 are not wound circularly, but rather in the form of a polygon consisting of chords 58 of the core circumference 50, because they are only supported at spaced points around the circumference 50 by the outer edges 36 of vanes 52.

Consequently, as shown in FIG. 4a, the upper part of the window 27 is at least partially blocked by the fibers 46, particularly in the circumferential center of the window 27 where the section of FIG. 4a is taken. The resulting obstruction of part of window 27 effectively modifies the window area and jeopardizes the uniformity of the blood flow.

FIGS. 4b and 5b illustrate the inventive solution to this problem. It will be seen that in accordance with the invention, the steeply inclined portion 38 of the manifold wall 24 is recessed at the step 54 from the vertical portion of manifold wall 24. The effect of this is shown in FIG. 4b. The fibers 56 adjacent to the top of the steep wall portion 38 are held spaced from the wall portion 38 by the recessed position of wall portion 38 caused by the step 54 to avoid obstructing the window 27.

It is understood that the exemplary core structure for blood oxygenators described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

We claim:

1. In a blood oxygenator having a rigid core with a substantially cylindrical surface onto which oxygenating fibers are wound, said core having formed therein a blood manifold from which blood can contact said fibers through windows disposed circumferentially of said surface and separated from one another by substantially radial vanes extending to said surface, said manifold containing a wall slanted with respect to the longitudinal axis of said core and having a portion adjacent to said surface, the improvement comprising so recessing said portion of said wall from said surface that the blood flow path from said manifold through fibers positioned along a chord of said surface is essentially unobstructed by said wall portion.

2. A blood oxygenator, comprising:

a) a rigid core having a substantially cylindrical surface; and b) layers of flexible fibers wound upon said core;

c) said core surface having formed therein a window extending substantially circumferentially along said core surface and being circumferentially delimited by vanes extending to said core surface;

d) said fibers, when wound upon said core, becoming positioned in said window along a chord of said window;

e) said core having a blood manifold defined in part by an inner wall, said wall having a portion inclined at an acute angle to the longitudinal axis of said core closely adjacent to said window;

f) said wall portion being sufficiently recessed from said window that said fibers positioned along said chord remain spaced from said inclined portion.

3. The blood oxygenator of claim 2, in which a plurality of said windows are disposed circumferentially around said core, said core surface extending axially above and below said windows, and said fibers are wound upon said core at an angle to a plane perpendicular to the axis of said core surface.

4. The blood oxygenator of claim 3, in which said angle is substantially 10°.

5. The blood oxygenator of claim 2, in which said recess is provided by interposing a horizontal portion of said manifold wall between said acutely inclined portion and said surface.

* * * * *